(12) United States Patent
Shiozaki

(10) Patent No.: US 7,184,158 B2
(45) Date of Patent: Feb. 27, 2007

(54) PRINT MANAGEMENT APPARATUS AND PRINT MANAGEMENT METHOD

(75) Inventor: Tadashi Shiozaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 727 days.

(21) Appl. No.: 10/171,589

(22) Filed: Jun. 17, 2002

(65) Prior Publication Data

US 2003/0007163 A1    Jan. 9, 2003

(30) Foreign Application Priority Data

Jul. 5, 2001  (JP)  ............................. 2001-204480
Apr. 5, 2002  (JP)  ............................. 2002-103541

(51) Int. Cl.
G06F 3/12       (2006.01)
G06F 15/00      (2006.01)

(52) U.S. Cl. ..................................... 358/1.15; 358/1.13

(58) Field of Classification Search ............... 358/1.15, 358/1.14, 1.13, 1.16, 1.17, 1.18, 1.1, 1.2, 358/1.3, 1.4, 1.5, 1.6, 1.7, 1.8, 1.9, 1.11, 1.12, 358/468, 426.01, 426.03

See application file for complete search history.

(56) References Cited

U.S. PATENT DOCUMENTS

| | | | | |
|---|---|---|---|---|
| 5,287,194 A | * | 2/1994 | Lobiondo | 358/296 |
| 5,813,348 A | * | 9/1998 | Zingher | 101/494 |
| 5,978,560 A | * | 11/1999 | Tan et al. | 358/1.15 |
| 6,600,569 B1 | * | 7/2003 | Osada et al. | 358/1.12 |

2002/0048036 A1 * 4/2002 Nakagawa et al. ........ 358/1.14

FOREIGN PATENT DOCUMENTS

| | | |
|---|---|---|
| JP | 06-295302  | 10/1994 |
| JP | 06-328817  | 11/1994 |
| JP | 08-016339  | 1/1996  |
| JP | 09-200463  | 7/1997  |
| JP | 10-049326  | 2/1998  |
| JP | 10-315590  | 12/1998 |
| JP | 11-053149  | 2/1999  |
| JP | 11-091211  | 4/1999  |
| JP | 11-119932  | 4/1999  |
| JP | 2000-029647 | 1/2000 |
| JP | 2000-267833 | 9/2000 |
| JP | 2001-113800 | 4/2001 |
| JP | 2001-147790 | 5/2001 |

* cited by examiner

*Primary Examiner*—Dov Popovici
(74) *Attorney, Agent, or Firm*—Oliff & Berridge, PLC

(57) ABSTRACT

A system gives top priority to the printing information of any image ID having the time limit of printing set today, by taking into account printability information with regard to the paper species and the ink species set in each printer. The system then gives second priority in a range of stock to the printing information of any image ID having the paper species coincident with the printability information, regardless of the time limit of printing except today, and prints such printing information with a specified printer that has the earliest expected finish time of printing. The system gives third priority in the range of stock and in a preset closing time to the printing information of any image ID having the paper species of a greatest number of print requirements, and prints such printing information with a specified printer that has the earliest expected finish time of printing.

19 Claims, 15 Drawing Sheets

FIG.3

| Application Number | Image ID | Paper Species | Ink Species | Print Size | Time limit of Delivery | Time limit of Printing |
|---|---|---|---|---|---|---|
| 1 | G01235 | Glossy Paper A | Pigment Ink A | A0 | 2001/7/16 | 2001/7/13 |
| 2 | G01352 | Glossy Paper B | Pigment Ink A | A0 | 2001/7/16 | 2001/7/13 |
| 3 | G00025 | Glossy Paper A | Pigment Ink A | A0 | 2001/7/17 | 2001/7/14 |
| 4 | G00324 | Glossy Paper C | Pigment Ink B | A1 | 2001/7/17 | 2001/7/14 |
| 5 | G00129 | Glossy Paper B | Pigment Ink B | A0 | 2001/7/17 | 2001/7/14 |
| 6 | G02354 | Glossy Paper C | Dye Ink A | A1 | 2001/7/17 | 2001/7/14 |
| 7 | G03542 | Glossy Paper A | Pigment Ink B | A0 | 2001/7/17 | 2001/7/14 |
| 8 | G01598 | Glossy Paper D | Pigment Ink A | A0 | 2001/7/17 | 2001/7/14 |
| 9 | G01748 | Glossy Paper D | Pigment Ink A | A1 | 2001/7/17 | 2001/7/14 |
| 10 | G02048 | Glossy Paper C | Dye Ink B | A0 | 2001/7/17 | 2001/7/14 |
| 11 | G00824 | Glossy Paper A | Pigment Ink A | A0 | 2001/7/17 | 2001/7/14 |
| 12 | G01621 | Glossy Paper D | Pigment Ink A | A0 | 2001/7/17 | 2001/7/14 |
| 13 | G01603 | Glossy Paper C | Pigment Ink C | A1 | 2001/7/17 | 2001/7/14 |
| 14 | G02015 | Glossy Paper A | Pigment Ink C | A0 | 2001/7/17 | 2001/7/14 |
| 15 | G00950 | Glossy Paper D | Pigment Ink B | A0 | 2001/7/17 | 2001/7/14 |
| 16 | G02285 | Glossy Paper B | Pigment Ink C | A0 | 2001/7/17 | 2001/7/14 |
| 17 | G01884 | Glossy Paper B | Pigment Ink C | A0 | 2001/7/17 | 2001/7/14 |
| 18 | G03122 | Glossy Paper C | Pigment Ink A | A1 | 2001/7/17 | 2001/7/14 |
| 19 | G00644 | Glossy Paper D | Pigment Ink A | A1 | 2001/7/17 | 2001/7/14 |
| 20 | G00721 | Glossy Paper B | Dye Ink A | A1 | 2001/7/17 | 2001/7/14 |
| 21 | G03121 | Glossy Paper B | Dye Ink B | A0 | 2001/7/17 | 2001/7/14 |
| 22 | G02004 | Glossy Paper D | Pigment Ink B | A0 | 2001/7/18 | 2001/7/15 |
| 23 | G01106 | Glossy Paper D | Pigment Ink B | A0 | 2001/7/18 | 2001/7/15 |
| 24 | G03162 | Glossy Paper C | Pigment Ink A | A1 | 2001/7/18 | 2001/7/15 |
| 25 | G00733 | Glossy Paper A | Pigment Ink C | A0 | 2001/7/18 | 2001/7/15 |
| 26 | G00431 | Glossy Paper A | Pigment Ink B | A0 | 2001/7/18 | 2001/7/15 |
| 27 | G00926 | Glossy Paper A | Dye Ink B | A0 | 2001/7/18 | 2001/7/15 |
| 28 | G01318 | Glossy Paper B | Pigment Ink A | A0 | 2001/7/18 | 2001/7/15 |
| 29 | G02314 | Glossy Paper A | Dye Ink A | A1 | 2001/7/18 | 2001/7/15 |
| 30 | G01924 | Glossy Paper C | Pigment Ink A | A1 | 2001/7/18 | 2001/7/15 |

FIG.4

| Printer | Paper Species | Ink Species |
|---|---|---|
| 44 | Glossy Paper A | Pigment Ink A |
| 46 | Glossy Paper B | Dye Ink A |

FIG.5

| | Stock (Number of sheets in conversion to size A0) |
|---|---|
| Paper Species | |
| Glossy Paper A | 10 |
| Glossy Paper B | 6 |
| Glossy Paper C | 6 |
| Glossy Paper D | 4 |
| | |
| | |
| Ink Species | |
| Pigment Ink A | 10 |
| Pigment Ink B | 6 |
| Pigment Ink C | 4 |
| Dye Ink A | 6 |
| Dye Ink B | 6 |
| | |
| | |

FIG.6

Printing Order with Printer 44

| Application Number | Image ID | Paper Species | Ink Species | Print size | Expected Finish Time of Printing |
|---|---|---|---|---|---|
| 1 | G01235 | Glossy Paper A | Pigment Ink A | A0 | 9:30 |
| | | | | | |
| | | | | | |
| | | | | | |
| | | | | | |
| | | | | | |

FIG.7

Printing Order with Printer 46

| Application Number | Image ID | Paper Species | Ink Species | Print Size | Expected Finish Time of Printing |
|---|---|---|---|---|---|
| 2 | G01352 | Glossy Paper B | Pigment Ink A | A0 | 10:00 |
| | | | | | |
| | | | | | |
| | | | | | |
| | | | | | |
| | | | | | |

FIG.8

| Application Number | Image ID | Paper Species | Ink Species | Print Size | Time limit of Delivery | Time limit of Printing |
|---|---|---|---|---|---|---|
| 3 | G00025 | Glossy Paper A | Pigment Ink A | A0 | 2001/7/17 | 2001/7/14 |
| 11 | G00824 | Glossy Paper A | Pigment Ink A | A0 | 2001/7/17 | 2001/7/14 |
| 7 | G03542 | Glossy Paper A | Pigment Ink B | A0 | 2001/7/17 | 2001/7/14 |
| 26 | G00431 | Glossy Paper A | Pigment Ink B | A0 | 2001/7/18 | 2001/7/15 |
| 14 | G02015 | Glossy Paper A | Pigment Ink C | A0 | 2001/7/17 | 2001/7/14 |
| 25 | G00733 | Glossy Paper A | Pigment Ink C | A0 | 2001/7/18 | 2001/7/15 |
| 29 | G02314 | Glossy Paper A | Dye Ink A | A1 | 2001/7/18 | 2001/7/15 |
| 27 | G00926 | Glossy Paper A | Dye Ink B | A0 | 2001/7/18 | 2001/7/15 |
| 28 | G01318 | Glossy Paper B | Pigment Ink A | A0 | 2001/7/18 | 2001/7/15 |
| 5 | G00129 | Glossy Paper B | Pigment Ink B | A0 | 2001/7/17 | 2001/7/14 |
| 16 | G02285 | Glossy Paper B | Pigment Ink C | A0 | 2001/7/17 | 2001/7/14 |
| 17 | G01884 | Glossy Paper B | Pigment Ink C | A0 | 2001/7/17 | 2001/7/14 |
| 20 | G00721 | Glossy Paper B | Dye Ink A | A1 | 2001/7/17 | 2001/7/14 |
| 21 | G03121 | Glossy Paper B | Dye Ink B | A0 | 2001/7/17 | 2001/7/14 |
| 18 | G03122 | Glossy Paper C | Pigment Ink A | A1 | 2001/7/17 | 2001/7/14 |
| 24 | G03162 | Glossy Paper C | Pigment Ink A | A1 | 2001/7/18 | 2001/7/15 |
| 30 | G01924 | Glossy Paper C | Pigment Ink A | A1 | 2001/7/18 | 2001/7/15 |
| 4 | G00324 | Glossy Paper C | Pigment Ink B | A1 | 2001/7/17 | 2001/7/14 |
| 13 | G01603 | Glossy Paper C | Pigment Ink C | A1 | 2001/7/17 | 2001/7/14 |
| 6 | G02354 | Glossy Paper C | Dye Ink A | A1 | 2001/7/17 | 2001/7/14 |
| 10 | G02048 | Glossy Paper C | Dye Ink B | A0 | 2001/7/17 | 2001/7/14 |
| 8 | G01598 | Glossy Paper D | Pigment Ink A | A0 | 2001/7/17 | 2001/7/14 |
| 9 | G01748 | Glossy Paper D | Pigment Ink A | A1 | 2001/7/17 | 2001/7/14 |
| 12 | G01621 | Glossy Paper D | Pigment Ink A | A0 | 2001/7/17 | 2001/7/14 |
| 19 | G00644 | Glossy Paper D | Pigment Ink A | A1 | 2001/7/17 | 2001/7/14 |
| 15 | G00950 | Glossy Paper D | Pigment Ink B | A0 | 2001/7/17 | 2001/7/14 |
| 22 | G02004 | Glossy Paper D | Pigment Ink B | A0 | 2001/7/18 | 2001/7/15 |
| 23 | G01106 | Glossy Paper D | Pigment Ink B | A0 | 2001/7/18 | 2001/7/15 |

FIG.9

| Printer | Paper Species | Ink Species |
|---|---|---|
| 44 | Glossy Paper A | Pigment Ink A |
| 46 | Glossy Paper B | Pigment Ink A |

FIG.10

Printing Order with Printer 44

| Application Number | Image ID | Paper Species | Ink Species | Print Size | Expected Finish Time of Printing |
|---|---|---|---|---|---|
| 1 | G01235 | Glossy Paper A | Pigment Ink A | A0 | 9:30 |
| 3 | G00025 | Glossy Paper A | Pigment Ink A | A0 | 10:00 |
| 11 | G00824 | Glossy Paper A | Pigment Ink A | A0 | 10:30 |
| 7 | G03542 | Glossy Paper A | Pigment Ink B | A0 | 11:30 |
| 26 | G00431 | Glossy Paper A | Pigment Ink B | A0 | 12:00 |
| 14 | G02015 | Glossy Paper A | Pigment Ink C | A0 | 13:00 |
| 25 | G00733 | Glossy Paper A | Pigment Ink C | A0 | 13:30 |
| 29 | G02314 | Glossy Paper A | Dye Ink A | A1 | 14:15 |
| 27 | G00926 | Glossy Paper A | Dye Ink B | A0 | 15:15 |
| | | | | | |
| | | | | | |

FIG.11

Printing Order with Printer 46

| Application Number | Image ID | Paper Species | Ink Species | Print Size | Expected Finish Time of Printing |
|---|---|---|---|---|---|
| 2 | G01352 | Glossy Paper B | Pigment Ink A | A0 | 10:00 |
| 28 | G01318 | Glossy Paper B | Pigment Ink A | A0 | 10:30 |
| 5 | G00129 | Glossy Paper B | Pigment Ink B | A0 | 11:30 |
| 16 | G02285 | Glossy Paper B | Pigment Ink C | A0 | 12:30 |
| 17 | G01884 | Glossy Paper B | Pigment Ink C | A0 | 13:00 |
| 20 | G00721 | Glossy Paper B | Dye Ink A | A1 | 13:45 |
|  |  |  |  |  |  |
|  |  |  |  |  |  |

FIG.12

| Application Number | Image ID | Paper Species | Ink Species | Print Size | Time limit of Delivery | Time limit of Printing |
|---|---|---|---|---|---|---|
| 21 | G03121 | Glossy Paper B | Dye Ink B | A0 | 2001/7/17 | 2001/7/14 |
| 18 | G03122 | Glossy Paper C | Pigment Ink A | A1 | 2001/7/17 | 2001/7/14 |
| 24 | G03162 | Glossy Paper C | Pigment Ink A | A1 | 2001/7/18 | 2001/7/15 |
| 30 | G01924 | Glossy Paper C | Pigment Ink A | A1 | 2001/7/18 | 2001/7/15 |
| 4 | G00324 | Glossy Paper C | Pigment Ink B | A1 | 2001/7/17 | 2001/7/14 |
| 13 | G01603 | Glossy Paper C | Pigment Ink C | A1 | 2001/7/17 | 2001/7/14 |
| 6 | G02354 | Glossy Paper C | Dye Ink A | A1 | 2001/7/17 | 2001/7/14 |
| 10 | G02048 | Glossy Paper C | Dye Ink B | A0 | 2001/7/17 | 2001/7/14 |
| 8 | G01598 | Glossy Paper D | Pigment Ink A | A0 | 2001/7/17 | 2001/7/14 |
| 9 | G01748 | Glossy Paper D | Pigment Ink A | A1 | 2001/7/17 | 2001/7/14 |
| 12 | G01621 | Glossy Paper D | Pigment Ink A | A0 | 2001/7/17 | 2001/7/14 |
| 19 | G00644 | Glossy Paper D | Pigment Ink A | A1 | 2001/7/17 | 2001/7/14 |
| 15 | G00950 | Glossy Paper D | Pigment Ink B | A0 | 2001/7/17 | 2001/7/14 |
| 22 | G02004 | Glossy Paper D | Pigment Ink B | A0 | 2001/7/18 | 2001/7/15 |
| 23 | G01106 | Glossy Paper D | Pigment Ink B | A0 | 2001/7/18 | 2001/7/15 |

FIG.13

Printing Order with Printer 46

| Application Number | Image ID | Paper Species | Ink Species | Print Size | Expected Finish Time of Printing |
|---|---|---|---|---|---|
| 2 | G01352 | Glossy Paper B | Pigment Ink A | A0 | 10:00 |
| 28 | G01318 | Glossy Paper B | Pigment Ink A | A0 | 10:30 |
| 5 | G00129 | Glossy Paper B | Pigment Ink B | A0 | 11:30 |
| 16 | G02285 | Glossy Paper B | Pigment Ink C | A0 | 12:30 |
| 17 | G01884 | Glossy Paper B | Pigment Ink C | A0 | 13:00 |
| 20 | G00721 | Glossy Paper B | Dye Ink A | A1 | 13:45 |
| 8 | G01598 | Glossy Paper D | Pigment Ink A | A0 | 15:15 |
| 9 | G01748 | Glossy Paper D | Pigment Ink A | A1 | 15:30 |
| 12 | G01621 | Glossy Paper D | Pigment Ink A | A0 | 16:00 |
| 19 | G00644 | Glossy Paper D | Pigment Ink A | A1 | 16:15 |
| 15 | G00950 | Glossy Paper D | Pigment Ink B | A0 | 17:15 |
|  |  |  |  |  |  |
|  |  |  |  |  |  |

FIG.14

| Application Number | Image ID | Paper Species | Ink Species | Print Size | Time limit of Delivery | Time limit of Printing |
|---|---|---|---|---|---|---|
| 21 | G03121 | Glossy Paper B | Dye Ink B | A0 | 2001/7/17 | 2001/7/14 |
| 18 | G03122 | Glossy Paper C | Pigment Ink A | A1 | 2001/7/17 | 2001/7/14 |
| 24 | G03162 | Glossy Paper C | Pigment Ink A | A1 | 2001/7/18 | 2001/7/15 |
| 30 | G01924 | Glossy Paper C | Pigment Ink A | A1 | 2001/7/18 | 2001/7/15 |
| 4 | G00324 | Glossy Paper C | Pigment Ink B | A1 | 2001/7/17 | 2001/7/14 |
| 13 | G01603 | Glossy Paper C | Pigment Ink C | A1 | 2001/7/17 | 2001/7/14 |
| 6 | G02354 | Glossy Paper C | Dye Ink A | A1 | 2001/7/17 | 2001/7/14 |
| 10 | G02048 | Glossy Paper C | Dye Ink B | A0 | 2001/7/17 | 2001/7/14 |
| 22 | G02004 | Glossy Paper D | Pigment Ink B | A0 | 2001/7/18 | 2001/7/15 |
| 23 | G01106 | Glossy Paper D | Pigment Ink B | A0 | 2001/7/18 | 2001/7/15 |

FIG.15

Printing Order with Printer 44

| Application Number | Image ID | Paper Species | Ink Species | Print Size | Expected Finish Time of Printing |
|---|---|---|---|---|---|
| 1 | G01235 | Glossy Paper A | Pigment Ink A | A0 | 9:30 |
| 3 | G00025 | Glossy Paper A | Pigment Ink A | A0 | 10:00 |
| 11 | G00824 | Glossy Paper A | Pigment Ink A | A0 | 10:30 |
| 7 | G03542 | Glossy Paper A | Pigment Ink B | A0 | 11:30 |
| 26 | G00431 | Glossy Paper A | Pigment Ink B | A0 | 12:00 |
| 14 | G02015 | Glossy Paper A | Pigment Ink C | A0 | 13:00 |
| 25 | G00733 | Glossy Paper A | Pigment Ink C | A0 | 13:30 |
| 29 | G02314 | Glossy Paper A | Dye Ink A | A1 | 14:15 |
| 27 | G00926 | Glossy Paper A | Dye Ink B | A0 | 15:15 |
| 18 | G03122 | Glossy Paper C | Pigment Ink A | A1 | 16:30 |
| 24 | G03162 | Glossy Paper C | Pigment Ink A | A1 | 16:45 |
| 30 | G01924 | Glossy Paper C | Pigment Ink A | A1 | 17:00 |
| | | | | | |
| | | | | | |

FIG.16

| Application Number | Image ID | Paper Species | Ink Species | Print Size | Time limit of Delivery | Time limit of Printing |
|---|---|---|---|---|---|---|
| 4 | G00324 | Glossy Paper C | Pigment Ink B | A1 | 2001/7/17 | 2001/7/14 |
| 6 | G02354 | Glossy Paper C | Dye Ink A | A1 | 2001/7/17 | 2001/7/14 |
| 10 | G02048 | Glossy Paper C | Dye Ink B | A0 | 2001/7/17 | 2001/7/14 |
| 13 | G01603 | Glossy Paper C | Pigment Ink C | A1 | 2001/7/17 | 2001/7/14 |
| 21 | G03121 | Glossy Paper B | Dye Ink B | A0 | 2001/7/17 | 2001/7/14 |
| 22 | G02004 | Glossy Paper D | Pigment Ink B | A0 | 2001/7/18 | 2001/7/15 |
| 23 | G01106 | Glossy Paper D | Pigment Ink B | A0 | 2001/7/18 | 2001/7/15 |

FIG.17

| Printer | Paper Species | Ink Species |
|---|---|---|
| 44 | Glossy Paper C | Pigment Ink A |
| 46 | Glossy Paper D | Pigment Ink B |

FIG.18

| | Stock (Number of Sheets in conversion to size A0) |
|---|---|
| Paper Species | |
| Glossy Paper A | 1.5 |
| Glossy Paper B | 0.5 |
| Glossy Paper C | 4.5 |
| Glossy Paper D | 0 |
| | |
| | |
| Ink Species | |
| Pigment Ink A | 0.5 |
| Pigment Ink B | 2 |
| Pigment Ink C | 0 |
| Dye Ink A | 5 |
| Dye Ink B | 5 |
| | |
| | |

PRINT MANAGEMENT APPARATUS AND PRINT MANAGEMENT METHOD

BACKGROUND OF THE INVENTION

1. Field of the Invention

The present invention relates to a print management apparatus and a print management method. More specifically the present invention pertains to a print management apparatus that manages printing of multiple image data as well as to a print management method that manages an order of printing multiple image data with one or multiple printers.

2. Description of the Prior Art

The proposed print management apparatus prints image data in an order of acceptance of printing instructions. This apparatus is constructed, for example, as a printer server connecting with a computer network and prints image data in a sequence of acceptance of printing instructions from a plurality of computers via the network. In this system, image data to be printed and their printing conditions are stored in an external storage device like a memory or an HDD attached to the apparatus and outputs the image data and the printing conditions to a printer for printing.

In the prior art apparatus that prints the image data in the order of acceptance of printing instructions, frequent replacement of ink and paper is required when the accepted printing instructions specify different paper species, different paper sizes, and different ink species as printing conditions. This undesirably lowers the printing efficiency and requires rather troublesome, complicated operations for printing.

SUMMARY OF THE INVENTION

The object of the present invention is thus to enhance the efficiency of printing multiple image data.

The object of the invention is also to reduce the required operations for printing.

In order to achieve at least a part of the aforementioned objects, the print management apparatus and print management method of the present invention are structured as follows.

A first print management apparatus of the present invention is a print management apparatus that manages printing of a plurality of image data, the print management apparatus including:

a printing condition storage module that stores printing conditions for multiple image data of interest to be printed; and a printing order specification module that specifies a printing order of the multiple image data of interest, based on the stored printing conditions.

The first print management apparatus of the present invention specifies the printing order of multiple image data of interest to be printed, based on the printing conditions of the image data. Compared with the prior art system of printing image data in the order of acceptance, this arrangement desirably enhances the printing efficiency and reduces the operations required for printing. The printing conditions include at least one of a printing medium species, a print size, an ink species, and a time limit of printing. The printing medium species represents a type of paper, a type of film, or a type of cloth as the printing medium.

As one aspect, in the first print management apparatus of the present invention, the printing conditions can include a printing medium species, and the printing order specification module can specify the printing order, based on the printing medium species. This arrangement ensures specification of the printing order, based on the printing medium species. In this case, the printing order specification module can specify the printing order by giving preference to a specific printing medium species having a large number of print requirements. This arrangement enables the image data having the printing medium species of a large printing quantity to be preferentially printed, and does not require frequent replacement of the printing medium. This arrangement further enhances the printing efficiency, while reducing the operations required for printing, for example, replacement of the printing medium. In addition, the printing conditions can include a time limit of printing, and the printing order specification module can specify the printing order by giving preference to image data having the time limit of printing within a predetermined time period over the printing order based on the printing medium species. This arrangement enables the image data having the time limit of printing within a predetermined time period to be preferentially printed, thus desirably keeping the time limit of printing.

As another aspect, in the first print management apparatus of the present invention, there can be provided a stock information storage module that stores stock information of an expendable required for printing the image data, and the printing order specification module can specify the printing order, based on the stock information of the expendable stored in the stock information storage module. This arrangement ensures efficient printing, based on the stock of expendables. In this case, the printing order specification module can compute a printable quantity based on the stock information of the expendable, and specify the printing order in a range of the computed printable quantity. Here, the stock information of the expendable includes at least either one of a stock of printing medium and a stock of ink.

As still another aspect, in the first print management apparatus of the present invention, there can be provided a printable condition input module that inputs a printable condition of a printer used for printing the image data, and the printing order specification module specifies the printing order, based on the printable condition input by the printable condition input module. This arrangement enables the image data to be efficiently printed, based on the printability condition of each printer. In this case, the printable condition can include at least either one of a printing medium species and an ink species set in the printer, and the printing order specification module can specify the printing order by giving preference to image data having at least one of the printing medium species and the ink species set in the printer as the printing condition. This arrangement enables the image data having the printing medium species or the ink species set in the printer to be preferentially printed, thus further enhancing the printing efficiency and reducing the operations required for printing, for example, replacement of the printing medium and replacement of the ink.

As still another aspect, in the first print management apparatus of the present invention, the printing order specification module can specify the printing order with regard to each of plural printers, which are used for printing the multiple image data of interest. This arrangement enables the multiple image data of interest to be efficiently printed with multiple printers.

As still further another aspect, in the first print management apparatus of the present invention, there can be provided a printing order output module that outputs the printing order specified by the printing order specification module. This arrangement ensures output of the specified printing order.

Additionally, as still another aspect, in the first print management apparatus of the present invention, the printing order specification module can specify the printing order at a preset timing. Here the 'preset timing' may be a regularly repeated timing like a preset hour or a preset day of the week, or an input timing of an instruction for specifying the printing order. This arrangement enables the printing order of the multiple image data to be specified at the preset timing.

A second print management apparatus of the present invention is a print management apparatus that manages printing of a plurality of image data, the print management apparatus including:

a printing condition storage module that stores printing conditions for multiple image data of interest to be printed;

a retrieval module that retrieves a printing condition satisfying a predetermined term, among the printing conditions stored in the printing condition storage module; and an output module that gives a preset output, when the printing condition satisfying the predetermined term is retrieved by the retrieval module.

As one aspect, the second print management apparatus of the present invention gives a preset output in response to retrieval of a printing condition that satisfies a predetermined term among the stored printing conditions for multiple image data of interest to be printed. This arrangement thus informs a user of retrieval of the printing condition that satisfies the predetermined term. For example, when printing conditions include a printing medium species and the predetermined term is that a number of print requirements for an identical printing medium species is not less than a given number, the apparatus notifies the user of the presence of the given number of or a greater number of image data of interest to be printed with the identical printing medium species. In another example, when the printing conditions include a time limit of printing and the predetermined term is that the time limit of printing is within a predetermined time period, the apparatus notifies the user of the presence of the image data of interest having the time limit of printing within the predetermined time period. Notification of the retrieval of the printing condition satisfying the predetermined term enables the multiple image data of interest to be printed with high efficiency, while reducing the operations required for printing, for example, replacement of the printing medium species. The preset output may be display of at least part of the predetermined term and the retrieved printing condition.

As another aspect, in the second print management apparatus of the present invention, there can be provided a printing order change module that changes the printing order to preferentially print specific image data corresponding to the printing condition retrieved by the retrieval module. This arrangement enables the image data corresponding to the retrieved printing condition to be preferentially printed.

The technique of the present invention is not restricted to the first print management apparatus or the second print management apparatus described above, but is applicable to a print management method with the first print management apparatus as well as to a print management method with the second print management apparatus. Another application of the present invention is a computer program that causes a computer to function as the first print management apparatus or the second print management apparatus.

BRIEF DESCRIPTION OF THE DRAWINGS

FIG. 3 shows an example of printing information;

FIG. 4 shows an example of printability information;

FIG. 5 shows an example of stock information of expendables;

FIG. 6 shows a schedule of a large-sized printer 44 when printing information of application number 1 is specified as an entry to be printed with the large-sized printer 44 and an expected finish time of printing is estimated;

FIG. 7 shows a schedule of a large-sized printer 46 when printing information of application number 2 is specified as an entry to be printed with the large-sized printer 46 and an expected finish time of printing is estimated;

FIG. 8 shows a list of the remaining pieces of printing information except the printing information of the application numbers 1 and 2 having the time limit of printing set today (July 13), which are rearranged according to the paper species and the ink species;

FIG. 9 shows printability information on completion of step S120 in the flowchart of FIG. 2;

FIG. 10 shows a schedule of the large-sized printer 44 when pieces of printing information having a paper species 'Glossy Paper A' are specified as entries to be printed with the large-sized printer 44 and the expected finish time of printing is estimated;

FIG. 11 shows a schedule of the large-sized printer 46 when pieces of printing information having a paper species 'Glossy Paper B' are specified as entries to be printed with the large-sized printer 46 and the expected finish time of printing is estimated;

FIG. 12 shows a list of the remaining pieces of printing information except the printing information specified as the entries based on the printability information, which are rearranged according to the paper species and the ink species;

FIG. 13 shows a schedule of the large-sized printer 46 when pieces of printing information having a paper species 'Glossy Paper D' are specified as entries to be printed with the large-sized printer 46 and the expected finish time of printing is estimated;

FIG. 14 shows a list of the remaining pieces of printing information but the pieces of printing information with the printing condition 'Glossy Paper D' specified as the entries in the schedule of the large-sized printer 46, which are rearranged according to the paper species and the ink species;

FIG. 15 shows a schedule of the large-sized printer 44 when pieces of printing information having a paper species 'Glossy Paper C' are specified as entries to be printed with the large-sized printer 44 and the expected finish time of printing is estimated;

FIG. 16 shows a list of the remaining pieces of printing information of no entries after the specification of the printing order, which are rearranged in the order of application number;

FIG. 17 shows printability information after the entries of printing information have been printed in the printing order specified by the printing order specification process;

FIG. 18 shows stock information of expendables after the entries of printing information have been printed in the printing order specified by the printing order specification process.

DESCRIPTION OF THE PREFERRED EMBODIMENTS

Figure 1:
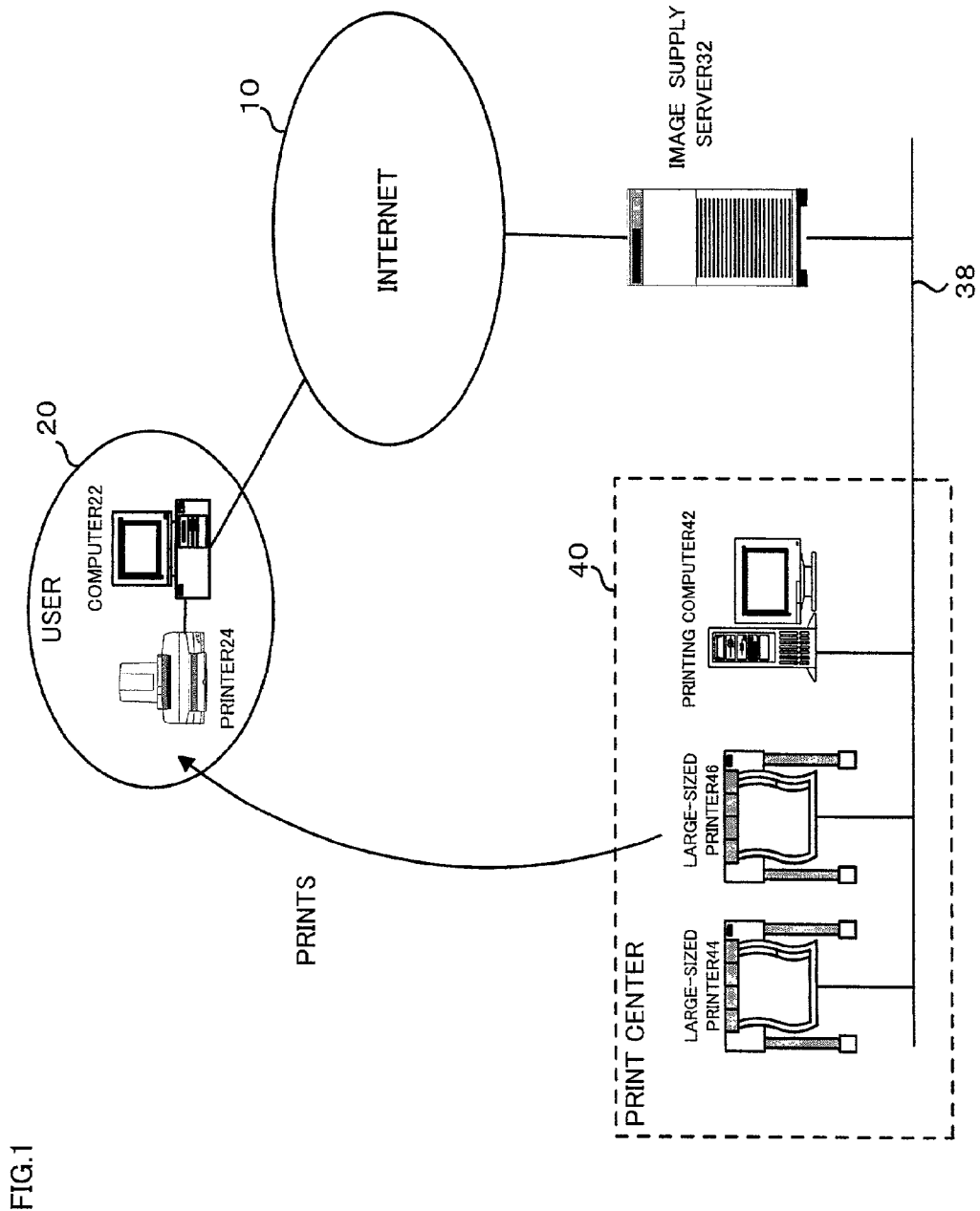
FIG. 1 schematically illustrates the construction of a system including a printing computer 42 in one embodiment of the present invention.

One mode of carrying out the present invention is discussed below as a preferred embodiment. FIG. 1 schematically illustrates the construction of a system including a printing computer 42 in one embodiment of the present invention. The printing computer 42 of the embodiment is located with multiple large-sized printers 44 and 46, which are capable of color printing up to a preset size A0 or B0, in a print center 40. The printing computer 42 is connected to an image supply server 32 via a network 38 different from the Internet 10. The image supply server 32 distributes still images (image data) as contents to a computer 22 of a user 20 via the Internet in response to a request of the user 20.

The image supply server 32 stores a large number of image data with IDs in an external storage device, such as a hard disk (not shown), and provides an image supply site. The user 20 who has signed up for and registered on the image supply site with input of personal information including the name, the postal address, and the E-mail address receives supply of images from the image supply site via the Internet 10. The image supply site distributes, in response to a selection by the user 20, image data having an adjusted size of the selected image and a control signal for printing to the computer 22 of the user 20 via the Internet 10. The image supply site also transmits the ID of the selected image, an output condition of the image, and delivery information like a destination of delivery to the user 20 via the network 38 to the printing computer 42 located in the print center 40.

The computer 22 of the user 20 is connected to a standard printer 24 that is capable of color printing up to a size A4 or B4. The printer 24 prints an image, based on the image data and the control signal for printing distributed from the image supply server of the embodiment.

The printing computer 42 of the embodiment functions as an image database that stores image data, which are identical with the large number of image data stored in the image supply server 32, with their IDs. The printing computer 42 also functions as a print management apparatus. The print management apparatus specifies a printing order of multiple image data representing multiple images ID of interest to be printed, which are output from the image supply server 32, with regard to each of the multiple printers 44 and 46, based on printing conditions of the images ID output together with the image ID from the image supply server 32, stock information of expendables used for the large-sized printers 44 and 46, and printability information like the paper species and the ink species set in the large-sized printers 44 and 46. The print management apparatus rearranges the image data according to the specified printing order and the printing conditions and outputs the rearranged image data to the large-sized printers 44 and 46. The print center 40 delivers each resulting print to the user 20 according to delivery information of the user 20 output from the image supply server 32.

The printing conditions of the images ID output from the image supply server 32 include the paper species as the printing medium, such as glossy paper or plain paper, the ink species, such as dye ink or pigment ink, the print size, and the time limit of printing calculated from the time limit of delivery. The images ID and their printing conditions output from the image supply server 32 are listed as printing information on a database and are stored in a predetermined area of an external storage device like an internal hard disk drive (not shown). The stock information of expendables and the printability information input through operations of an input device like a keyboard are also stored in a specified area of the external storage device like the inner hard disk drive.

Figure 2:
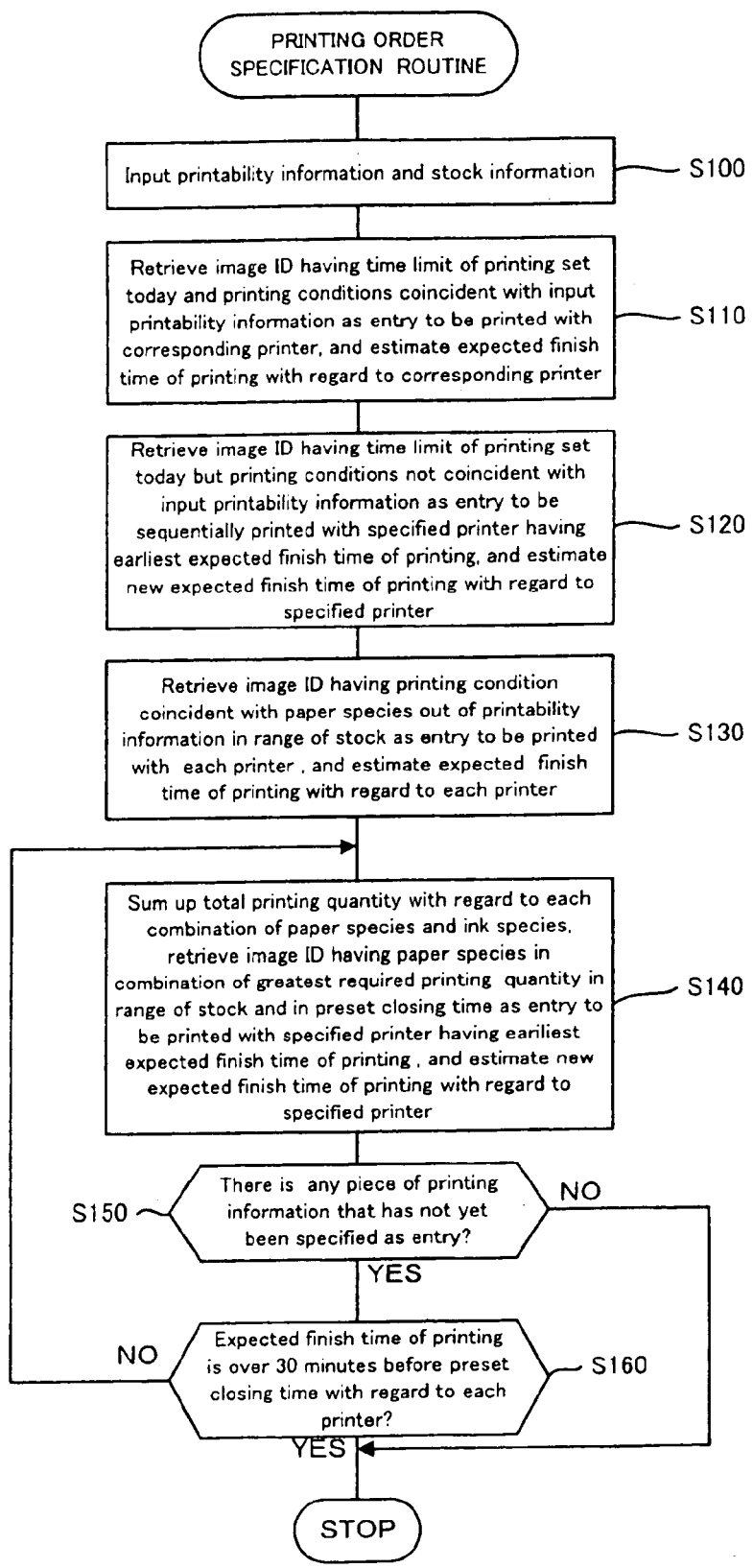
FIG. 2 is a flowchart showing a printing order specification routine carried out in the embodiment.

The following describes series of processing executed by the printing computer 42 in the system of the embodiment constructed as discussed above, especially a series of processing to specify the printing order. FIG. 2 is a flowchart showing a printing order specification routine. The procedure of this embodiment specifies the printing order according to the flowchart of FIG. 2, on the assumption that thirty pieces of printing information shown in FIG. 3 as images to be printed are stored in the printing computer 42 and the two large-sized printers 44 and 46 are used for printing these images. In the table of FIG. 3, the time limit of delivery represents the appointed date of delivery to each user, and the time limit of printing is set as three days prior to the time limit of delivery to have some time margin for delivery. The printing order specification routine shown in the flowchart of FIG. 2 is carried out before a preset start time of printing, for example, before 9 o'clock, every day.

When the program enters the printing order specification routine, the printing computer 42 first receives input of the printability information including the paper species and the ink species set in the large-sized printers 44 and 46 and the stock information of expendables (step S100). FIG. 4 shows an example of the printability information, and FIG. 5 shows an example of the stock information of expendables.

The printing computer 42 subsequently retrieves each image ID having the time limit of printing set today and the printing conditions coincident with the input printability information as an entry to be printed with the corresponding printer, and estimates an expected finish time of printing with the corresponding printer (step S110). In the example of FIG. 3, when today is Jul. 13, 2001, application numbers 1 and 2 are the pieces of printing information having the time limit of printing set today (July 13). The printability information of the large-sized printer 44 is 'Glossy Paper A' as the paper species and 'Pigment Ink A' as the ink species, whereas the printability information of the large-sized printer 46 is 'Glossy Paper B' as the paper species and 'Dye Ink A' as the ink species as shown in FIG. 4. The printing information of the application number 1 coincides with the printability information of the large-sized printer 44. The procedure of step S110 accordingly specifies the printing information of the application number 1 as an entry to be printed with the large-sized printer 44, and estimates the expected finish time of printing with regard to the large-sized printer 44. FIG. 6 shows a schedule of the large-sized printer 44 when the printing information of the application number 1 is specified as an entry to be printed with the large-sized printer 44 and the expected finish time of printing is estimated. In this example, it is assumed that the printing time is 15 minutes for a size A1 and 30 minutes for a size A0, the time required for replacement of ink is 30 minutes, and the time required for replacement of paper is 1 hour. The expected finish time of printing in the schedule of the large-sized printer 44 is estimated by adding 30 minutes required for printing the size A0 to the start time, 9 o'clock.

The printing computer 42 then retrieves each image ID having the time limit of printing set today but the printing conditions not coincident with the input printability information as an entry to be sequentially printed with a specified printer having the earliest expected finish time of printing, and estimates a new expected finish time of printing with the specified printer (step S120). In the illustrated example, the printing information of the application number 2 is retrieved. The procedure of step S120 specifies the printing information of the application number 2 as an entry to be printed with the printer having the earliest expected finish time of printing, that is, the large-sized printer 46, and estimates a new expected finish time of printing with regard to the large-sized printer 46. FIG. 7 shows a schedule of the large-sized printer 46 when the printing information of the application number 2 is specified as an entry to be printed with the large-sized printer 46 and the expected finish time of printing is estimated. The expected finish time of printing in the schedule of the large-sized printer 46 is estimated by adding 30 minutes for replacement of the ink from Dye Ink A to Pigment Ink A and 30 minutes for printing the size A0, totally 1 hour, to the start time, 9 o'clock.

On completion of the entries of the printing information having the time limit of printing set today, the printing computer 42 retrieves each image ID having the printing condition coincident with the paper species out of the printability information in the range of stock as an entry to be printed with each printer, and estimates an expected finish time of printing with the corresponding printer (step S130). FIG. 8 shows a list of the remaining pieces of printing information except the printing information of the application numbers 1 and 2 having the time limit of printing set today (July 13), which are rearranged according to the paper species and the ink species. FIG. 9 shows the printability information on completion of step S120. The procedure of step S130 specifies the printing information having the paper species 'Glossy Paper A' as entries to be printed with the large-sized printer 44, while specifying the printing information having the paper species 'Glossy Paper B' as entries to be printed with the large-sized printer 46. The procedure then estimates the expected finish time of printing with regard to each of the large-sized printers 44 and 46. FIG. 10 shows a schedule of the large-sized printer 44 when the pieces of printing information having the paper species 'Glossy Paper A' are specified as entries to be printed with the large-sized printer 44 and the expected finish time of printing is estimated. FIG. 11 shows a schedule of the large-sized printer 46 when the pieces of printing information having the paper species 'Glossy Paper B' are specified as entries to be printed with the large-sized printer 46 and the expected finish time of printing is estimated. The estimation of the expected finish time of printing is described previously. The total number of print requirements with regard to Glossy Paper A set in the large-sized printer 44 is 8.5 sheets (converted to the size A0), namely 1 sheet of the application number 1 having the time limit of printing set today and 7.5 sheets for eight pieces of printing information enumerated in FIG. 8. This is less than the stock, 10 sheets, shown in FIG. 5. All the pieces of printing information with the printing condition 'Glossy Paper A' enumerated in FIG. 8 are accordingly specified as entries to be printed with the large-sized printer 44. The total number of print requirements with regard to Glossy Paper B set in the large-sized printer 46 is, on the other hand, 6.5 sheets (converted to the size A0), namely 1 sheet of the application number 2 having the time limit of printing set today and 5.5 sheets for six pieces of printing information enumerated in FIG. 8. This exceeds the stock, 6 pages, shown in FIG. 5. The pieces of printing information except the last piece of printing information (the application number 21) with the printing condition 'Glossy Paper B' enumerated in FIG. 8 are accordingly specified as entries to be printed with the large-sized printer 46. The printing information of the application number 21 is not included as an entry in the schedule of the large-sized printer 46 shown in FIG. 11, because of the out of stock of the glossy paper B.

On completion of the entries based on the printability information, the printing computer 42 sums up the total printing quantity with regard to each combination of the paper species and the ink species, retrieves each image ID having the paper species in the combination of the greatest required printing quantity in the range of stock and in a preset closing time as an entry to be printed with the specified printer that has the earliest expected finish time of printing, and estimates a new finish time of printing with the specified printer (step S140). FIG. 12 shows a list of the remaining pieces of printing information except the printing information specified as the entries based on the printability information, which are rearranged according to the paper species and the ink species. In this example, the combination of the paper species 'Glossy Paper D' with the ink species 'Pigment Ink A' has the greatest required printing quantity, 3 sheets (converted to the size A0). The pieces of printing information having the printing condition 'Glossy Paper D' are accordingly specified as entries to be printed with the large-sized printer 46, which has the earlier expected finish time of printing compared with that of the large-sized printer 44. The pieces of printing information specified here as the entries are in the range of stock of Glossy Paper D (4 sheets in conversion to the size A0) and in a preset closing time (half past 17). The pieces of printing information having the application numbers 22 and 23 in the list of FIG. 12 are out of this range of stock and over the preset closing time and are thus not specified as entries. FIG. 13 shows a schedule of the large-sized printer 46 when the pieces of printing information having the paper species 'Glossy Paper D' are specified as entries to be printed with the large-sized printer 46 and the expected finish time of printing is estimated. The images ID having the paper species in the combination of the greatest required printing quantity are retrieved as entries, since the replacement of the paper species takes much longer time than the replacement of the ink species. This arrangement accordingly reduces the frequency of replacement of the paper species and thereby enhances the printing efficiency.

Specification of the entries based on the combination of the paper species and the ink species is repeated until there is no piece of printing information that has not yet been specified as an entry or until the expected finish time of printing is over 30 minutes before the preset closing time with regard to the respective printers at steps S150 and S160 in the flowchart of FIG. 2. In the illustrated example, on completion of the specification of the pieces of printing information having the printing condition 'Glossy Paper D' in the schedule of the large-sized printer 46, there are pieces of printing information that have not yet been specified as entries. While the expected finish time of printing with regard to the large-sized printer 46 is after 17 o'clock, that is, over 30 minutes before the preset closing time, the expected finish time of printing with regard to the large-sized printer 44 is before 17 o'clock, that is, not over 30 minutes before the preset closing time. The processing of step S140 is accordingly repeated. FIG. 14 shows a list of the remaining pieces of printing information but the pieces of printing information with the printing condition 'Glossy Paper D' specified as the entries in the schedule of the large-sized printer 46, which are rearranged according to the paper species and the ink species. In this state, the combination of the paper species 'Glossy Paper C' and the ink species 'Pigment Ink A' has the greatest required printing quantity, that is, 1.5 sheets (converted to the size A0). The pieces of printing information having the printing condition 'Glossy Paper' are thus specified as entries to be printed with the large-sized printer 44 where the expected finish time of printing has not yet reached the preset closing time. The pieces of printing information having the application numbers 4, 13, 6, and 10 in the list of FIG. 14 are not specified as the entries, since the expected finish time of printing is over the preset closing time (half past 17). FIG. 15 shows a schedule of the large-sized printer 44 when the pieces of printing information having the paper species 'Glossy Paper C' are specified as entries to be printed with the large-sized printer 44 and the expected finish time of printing is estimated.

On completion of the specification of the pieces of printing information having the printing condition 'Glossy Paper C' as the entries in the schedule of the large-sized printer 44, the program exits from the printing order specification routine although there are pieces of printing information that have not yet been specified as entries. This is because the expected finish time of printing is over 30 minutes before the preset closing time (that is, after 17 o'clock) with regard to both of the large-sized printer 44 and the large-sized printer 46. The printing orders with regard to the large-sized printers 44 and 46 specified in this printing order specification process are the sequences of the entries described above and accordingly follow the schedules of FIG. 15 and FIG. 13, respectively. FIG. 16 shows a list of the remaining pieces of printing information of no entries after the specification of the printing order, which are rearranged in the order of application number. FIG. 17 shows printability information after the entries of printing information have been printed in the printing order specified by the printing order specification process. FIG. 18 shows stock information of expendables after the entries of printing information have been printed in the printing order specified by the printing order specification process. The print schedules for next day, July 14, with regard to the large-sized printers 44 and 46 are made by checking shipment of expendables and specifying the printing order according to the flowchart of FIG. 2.

When the printing order of the images ID has been specified and the schedule has been made with regard to both of the large-sized printers 44 and 46, the printing computer 42 outputs the schedules of the large-sized printers 44 and 46 to a display device like a CRT or the printer. Simultaneously the printing computer 42 rearranges the stored image data according to the schedules of the large-sized printers 44 and 46 and outputs the rearranged data to the large-sized printers 44 and 46.

In the printing computer 42 of the embodiment described above, the printing order specification process sums up the total printing quantity with regard to each combination of the paper species and the ink species, and specifies the printing order with preference to each image ID having the paper species in the combination of the greatest required printing quantity. This arrangement desirably reduces the frequencies of replacement of the paper species and replacement of the ink species and thus enhances the printing efficiency. The printing order is specified in the range of stock of expendables, and is thus not wrecked due to shortage of the expendables. The printing order is also specified in the preset closing time, so that the printing operation is closed at the appropriate time.

The printing computer 42 of the embodiment specifies the printing order with preference to the pieces of printing information having the time limit of printing set today in the printing order specification process. This arrangement ensures delivery of resulting prints to each user 20 on or before due date. In the printing order specification process, the printing computer 42 of the embodiment then specifies the printing order with preference to the pieces of printing information having the printing conditions coincident with the printability information like the paper species and the ink species set in the large-sized printers 44 and 46. This arrangement desirably reduces the frequencies of replacement of the paper species and replacement of the ink species.

The printing order specification process executed by the printing computer 42 retrieves the pieces of printing information as entries in the range of stock of expendables. In the case where the expendables have a sufficient stock, the procedure may not utilize the stock information.

The printing order specification process executed by the printing computer 42 specifies the printing order by giving preference to the pieces of printing information having the time limit of printing set today. The preference is not restricted to today, but the preference in the specification of the printing order may be given to pieces of printing information within predetermined days prior to the time limit of printing or those within predetermined hours prior to the time limit of printing when the time limit is set as hours.

The printing order specification process executed by the printing computer 42 specifies the printing order by giving preference to the pieces of printing information having the paper species in the combination of the greatest required printing quantity. The preference in the specification of the printing order may be given to the pieces of printing information having the paper species of the greatest required printing quantity. In the case where the replacement of the ink species takes longer time than the replacement of the paper species, the preference in the specification of the printing order may be given to the pieces of printing information having the ink species in the combination of the greatest required printing quantity or those having the ink species of the greatest required printing quantity.

In the illustrated example, four papers, Glossy Papers A through D are used as the printing medium species. The printing medium is, however, not restricted to paper, but may be film or cloth. Five inks, Pigment Inks A through C and Dye Inks A and B, are used as the ink species, although they are not restrictive. The print size is the A-series size like the size A0 or the size A1 in the illustrated example, but may be the B-series size like a size B0 or a size B1 or combination of the A-series size with the B-series size. The procedure of the embodiment specifies the printing order in the system where multiple image data of interest are printed with the two large-sized printers 44 and 46. In possible modification, the printing order may be specified in the system where only one printer is used for printing or in the system where three or more printers are used for printing.

Figure 19:
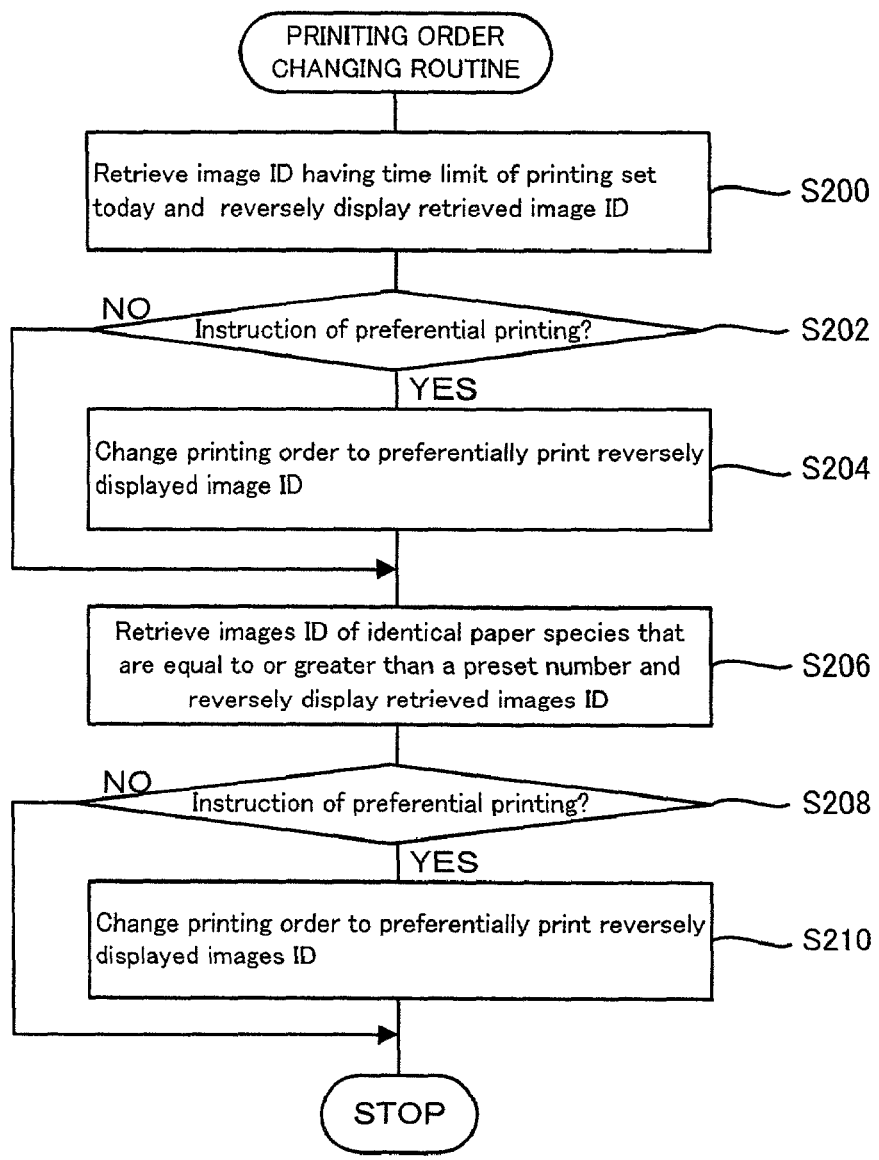
FIG. 19 is a flowchart showing a printing order changing routine executed by a printing computer in one modified example.

The printing computer 42 of the embodiment carries out the printing order specification process to automatically specify the printing order of images of interest to be printed, based on the printing conditions. One possible modification may retrieve each image ID having the printing condition satisfying a predetermined term and display the retrieved image ID reversely or with a different color or give a sound alert to show the retrieved image ID. In this arrangement, the printing order is preferably changed to preferentially print the retrieved image ID, in response to an instruction given by the user. FIG. 19 is a flowchart showing a printing order changing routine executed by the printing computer in such a modified example. When the program enters this printing order changing routine, the printing computer first retrieves each image ID having the time limit of printing set today and reversely displays the retrieved image ID (step S200). In the example of FIG. 3, when today is Jul. 13, 2001, the images ID of the application numbers 1 and 2 are reversely displayed. In response to an instruction of preferential printing given by the user (step S202), the printing computer changes the printing order to preferentially print the reversely displayed image ID (step S204). After the printing order has been changed or when no instruction of preferential printing has been given by the user, the printing computer retrieves images ID of an identical paper species that are equal to or greater than a preset number and reversely displays the retrieved images ID (Step S206). In the example of FIG. 8, when the preset number is 8, the eight images ID of Glossy Paper A are reversely displayed. In response to an instruction of preferential printing given by the user (step S208), the printing computer changes the printing order to preferentially print the reversely displayed images ID (step S210). When no instruction of preferential printing has been given by the user, the program exits from this routine without changing the printing order. The procedure of FIG. 19 changes the printing order to preferentially print the reversely displayed image ID in response to the instruction of preferential printing. One possible modification simply gives a reverse display but does not change the printing order.

In the embodiment and its modified examples discussed above, the printing computer 42 functioning as the print management apparatus is located together with the large-sized printers 44 and 46 in the print center 40. The printing computer 42 receives input of each image ID of interest to be printed and the printing conditions of the image ID from the image supply server 32 connecting with the Internet 10, and delivers a resulting print to the user 20. In one possible modification, the printing computer 42 may not receive input of the image ID of interest to be printed and the printing conditions of the image ID from the image display server 32 connecting with the Internet 10, nor deliver the resulting print to the user 20.

In the embodiment and its modified examples discussed above, the image supply server 32 is provided with the hard disk as the external storage device, and the image data stored in the hard disk are distributed to the computer 22 of the user 20. The hard disk drive may be replaced with a removable disk drive for a removable disk, such as a flexible disk, a magneto-optic disc (MO), a compact disc (CD), a digital video disc (DVD), a PC card (trademark by Personal Computer Memory Card International Organization), or a flash memory card. The image data are read from the removable disk inserted in the removable disk drive and are distributed.

In the embodiment and its modified examples discussed above, the printing computer 42 is provided with the hard disk as the external storage device, and the image data stored in the hard disk are printed with the large-sized printers 44 and 46. The hard disk drive may be replaced with a removable disk drive for any of the removable disks mentioned above. The image data are then read from the removable disk inserted in the removable disk drive and are printed with the large-sized printers 44 and 46. Instead of the printing computer 42, each of the large-sized printers 44 and 46 may be provided with a removable disk drive. In this case, the printing computer 42 outputs the ID allocated to image data of interest to be printed to the large-sized printer 44 or 46.

The computer 22 or the printer 24 of the user 20 may also be provided with a removable disk drive for any of the removable disks mentioned above. The image data are then read from the removable disk inserted in the removable disk drive and are printed with the printer 24.

The above embodiment and modified examples regard application of the present invention to the printing computer 42 as the print management apparatus connected with the multiple large-sized printers 44 and 46. The technique of the present invention is also applicable to a print management method that specifies the printing order of images of interest ID, as well as to a print management method that reversely displays an image ID having the retrieved printing conditions. Another application is a computer program that causes the computer to function as the print management apparatus. In this application, the computer program should include the respective steps of the printing order specification routine described above.

The above embodiment and its modified examples are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A print management apparatus that manages printing of a plurality of image data, said print management apparatus comprising:

a printing condition storage module that stores a plurality of printing conditions for multiple image data of interest to be printed, which include a time limit of printing, a printing medium species, and an ink species; and a printing order specification module that specifies a printing order of the multiple image data of interest, based on the stored printing conditions, such that the image data of an earlier time limit of printing has a higher priority of printing and image data having an identical combination of a printing medium species and an ink species as printing conditions are to be continually printed.

2. A print management apparatus in accordance with claim 1, wherein said printing order specification module specifies the printing order by giving a highest priority to a combination of a specific printing medium species and a specific ink species having a large amount of print requirement.

3. A print management apparatus in accordance with claim 2, wherein the amount of print requirement is expressed by number of printing sheets in a specific size.

4. A print management apparatus in accordance with claim 2, wherein said printing order specification module specifies the printing order by giving a second priority to the specific printing medium species, after giving the highest priority to the combination of the specific printing medium species and the specific ink species having the large amount of print requirement.

5. A print management apparatus in accordance with claim 2, wherein said printing order specification module specifies the printing order by giving a second priority to the specific ink species, after giving the highest priority to the combination of the specific printing medium species and the specific ink species having the large amount of print requirement.

6. A print management apparatus in accordance with claim 2, wherein said printing order specification module specifies the printing order by giving a second priority to either of the specific printing medium species and the specific ink species requiring a longer time for replacement to another printing medium species or to another ink species, after giving the highest priority to the combination of the specific printing medium species and the specific ink species having the large amount of print requirement.

7. A print management apparatus in accordance with claim 1, said print management apparatus further comprising:
a stock information storage module that stores stock information of an expendable required for printing the image data,
wherein said printing order specification module specifies the printing order, based on the stock information of the expendable stored in said stock information storage module.

8. A print management apparatus in accordance with claim 7, wherein said printing order specification module computes a printable quantity based on the stock information of the expendable, and specifies the printing order in a range of the computed printable quantity.

9. A print management apparatus in accordance with claim 7, wherein the stock information of the expendable includes at least either one of a stock of printing medium and a stock of ink.

10. A print management apparatus in accordance with claim 1, said print management apparatus further comprising:
a printable condition input module that inputs a printable condition of a printer used for printing the image data,
wherein said printing order specification module specifies the printing order, based on the printable condition input by said printable condition input module.

11. A print management apparatus in accordance with claim 10, wherein the printable condition includes at least either one of a printing medium species and an ink species set in said printer, and
said printing order specification module specifies the printing order by giving preference to image data having at least one of the printing medium species and the ink species set in said printer as the printing condition.

12. A print management apparatus in accordance with claim 1, wherein said printing order specification module specifies the printing order with regard to each of plural printers, which are used for printing the multiple image data of interest.

13. A print management apparatus in accordance with claim 1, said print management apparatus further comprising:
a printing order output module that outputs the printing order specified by said printing order specification module.

14. A print management apparatus in accordance with claim 1, wherein said printing order specification module specifies the printing order at a preset timing.

15. A print management method that manages an order of printing a plurality of image data with a printer, said print management method comprising:
(a) inputting a plurality of printing conditions for multiple image data of interest to be printed, which include a time limit of printing a printing medium species and an ink species;
(b) specifying a printing order of the multiple image data of interest, based on the stored printing conditions, such that image data of an earlier time limit of printing has a higher priority of printing and image data having an identical combination of a printing medium species and an ink species as printing conditions are to be continually printed; and
(c) giving a printing instruction to said printer in the specified printing order.

16. A print management method in accordance with claim 15, said print management method further comprising:
inputting stock information of an expendable required for printing the image data, prior to said step (b),
wherein said step (b) specifies the printing order, based on the input stock information of the expendable.

17. A print management method in accordance with claim 16, wherein said step (b) computes a printable quantity based on the stock information of the expendable, and specifies the printing order in a range of the computed printable quantity.

18. A print management method in accordance with claim 15, said print management method further comprising:
inputting a printable condition of said printer, prior to said step (b),
wherein said step (b) specifies the printing order, based on the input printable condition.

19. A print management method in accordance with claim 15, wherein said step (b) specifies the printing order with regard to each of plural printers, which are used for printing the multiple image data of interest.

* * * * *